US011179611B2

(12) United States Patent
Feeney

(10) Patent No.: US 11,179,611 B2
(45) Date of Patent: Nov. 23, 2021

(54) GOLF CLUB CARRIER ON A WHEEL

(71) Applicant: Philip Edward Feeney, Oceanside, CA (US)

(72) Inventor: Philip Edward Feeney, Oceanside, CA (US)

( * ) Notice: Subject to any disclaimer, the term of this patent is extended or adjusted under 35 U.S.C. 154(b) by 0 days.

(21) Appl. No.: 15/498,288

(22) Filed: Apr. 26, 2017

(65) Prior Publication Data
US 2019/0232132 A1 Aug. 1, 2019

(51) Int. Cl.
A63B 55/00 (2015.01)
A63B 55/10 (2006.01)
B62B 1/26 (2006.01)
B62B 1/00 (2006.01)
A63B 55/50 (2015.01)

(52) U.S. Cl.
CPC .............. A63B 55/10 (2013.01); A63B 55/50 (2015.10); B62B 1/008 (2013.01); B62B 1/262 (2013.01)

(58) Field of Classification Search
CPC .. B62B 1/18; B62B 1/262; B62B 1/04; B62B 1/14; B63B 55/60; B63B 55/10
See application file for complete search history.

(56) References Cited

U.S. PATENT DOCUMENTS

| 1,960,862 A * | 5/1934 | Charles | B62B 1/04 280/13 |
| 2,571,392 A * | 10/1951 | Watson | B62B 1/262 280/13 |
| 2,621,799 A * | 12/1952 | David | A63B 55/60 211/70.2 |
| 3,266,814 A * | 8/1966 | Dawson | B62B 1/262 280/13 |
| 3,531,136 A * | 9/1970 | Mobley | B62B 1/14 280/30 |
| 3,883,150 A * | 5/1975 | Varela | B62B 1/262 280/47.19 |
| 4,176,752 A * | 12/1979 | Taber | A63B 55/10 211/120 |
| 4,432,560 A * | 2/1984 | Patrick | B62B 1/18 280/47.19 |
| 4,770,326 A * | 9/1988 | Thompson | B62J 3/00 224/418 |
| 5,112,068 A * | 5/1992 | Liao | A63B 55/57 280/30 |
| 5,687,979 A * | 11/1997 | Plevka | B62B 1/20 280/47.19 |
| 6,547,085 B2 * | 4/2003 | Belisle | A47B 81/005 211/4 |
| 6,672,600 B2 * | 1/2004 | Engelhardt | A63B 55/57 280/47.26 |

* cited by examiner

Primary Examiner — Hau V Phan

(57) ABSTRACT

The Golf Club Carrier on a Wheel, containing a full complement of clubs, is easily maneuvered by a golfer. Each club is secured yet readily accessible. The Golf Club Carrier on a Wheel is light and easily moved forward at a walking pace without a burdensome effort. The unique design of the Golf Club Carrier on a Wheel places the weight of the clubs on the wheel's center of gravity and not engaging the golfers back by either carrying a bag or by pulling/pushing a golf cart.

4 Claims, 6 Drawing Sheets

GOLF CLUB CARRIER ON A WHEEL

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

(1) Field of the Invention

Many golfers prefer to walk the golf course while playing golf with a full complement of clubs available at all times. The weight burden for a golfer carrying a bag with a full complement of clubs is stressful on the player's body. Today more people are health conscious and desiring to exercise, but no one wants to hurt their back or shoulder by carrying a golf bag. The USGA (The United State Golf Association) rules allow up to 14 clubs. However, carrying clubs using current golf bags, which have club dividers and bag stands, are heavy and awkward. Often a golfer switches from carrying a bag to pushing or pulling a golf cart which also causes stress points to the players body. This invention has none of the awkwardness listed above and facilitates walking while having the golf clubs next to the golfer at all times. The invention can accommodate personal items and could have an electric motor for the wheel.

(2) Description of Related Art Including Information Disclosed Under 37 CFR 1.97 and 1.98

There is considerable prior art for carrying golf clubs using various designed carts and specially constructed golf club carriers built into a cart or a carriage, —Stringer 2571392, Taber 4176752, Belisle 6547085, Mobley 3531136, and Baldwin 1960862. Patrick 4432560 designed a. carrier to be tailored with tubes and require the golfer to hold the weighty assembly down with a handle to lift the club head front end assembly off the ground. The golfer must maintain the downward force to obtain balance and mobility while pushing the heavy assembly. Also Patrick has the golfer walking in back of the assembly which causes the weight to be heavily front loaded whereas The Golf Club Carrier on a Wheel has the golfer stationed such that there is equal weighting from front to back relative to the golfer's center of gravity. Wilson 2621799 utilizes a u-shaped collar which attaches to a golfer's golf bag atop a two-wheeled carriage. The collar is designed for less clubs than the USGA allows. The Golf Club Carrier on a Wheel does not require a golf bag or utilize a cart or a carriage but does secure individually the USGA allowed number of clubs. None of the listed prior art utilizes a wheel guided by a golfer in a walking posture without continuously depressing the heavy assembly to obtain mobility while pushing the two wheel carrier and clubs. There is room to attach a small bag to the Golf Club Carrier on a Wheel for accessories, balls, and place within the carrier an umbrella and a sweater or light jacket.

BRIEF SUMMARY OF THE INVENTION

The invention is easily maneuvered by a golfer containing a full complement of clubs with each club secure but readily accessible. The invention is light and easily moved forward at a walking pace without a burdensome effort. The golfer can select or replace clubs by tilting the invention onto either side's stand showing the clubs to be selected for the golfer's next shot. After the shot the golfer replaces the club, pulls the invention upright, positions the carrier's weight over the wheel and continues walking. The unique design positions the center of gravity of the carrier with clubs over the wheel's axel, so that the golfer is not physically strained by either carrying, pulling, or pushing a cart full of clubs.

DETAILED DESCRIPTION OF THE INVENTION

Figure 1:
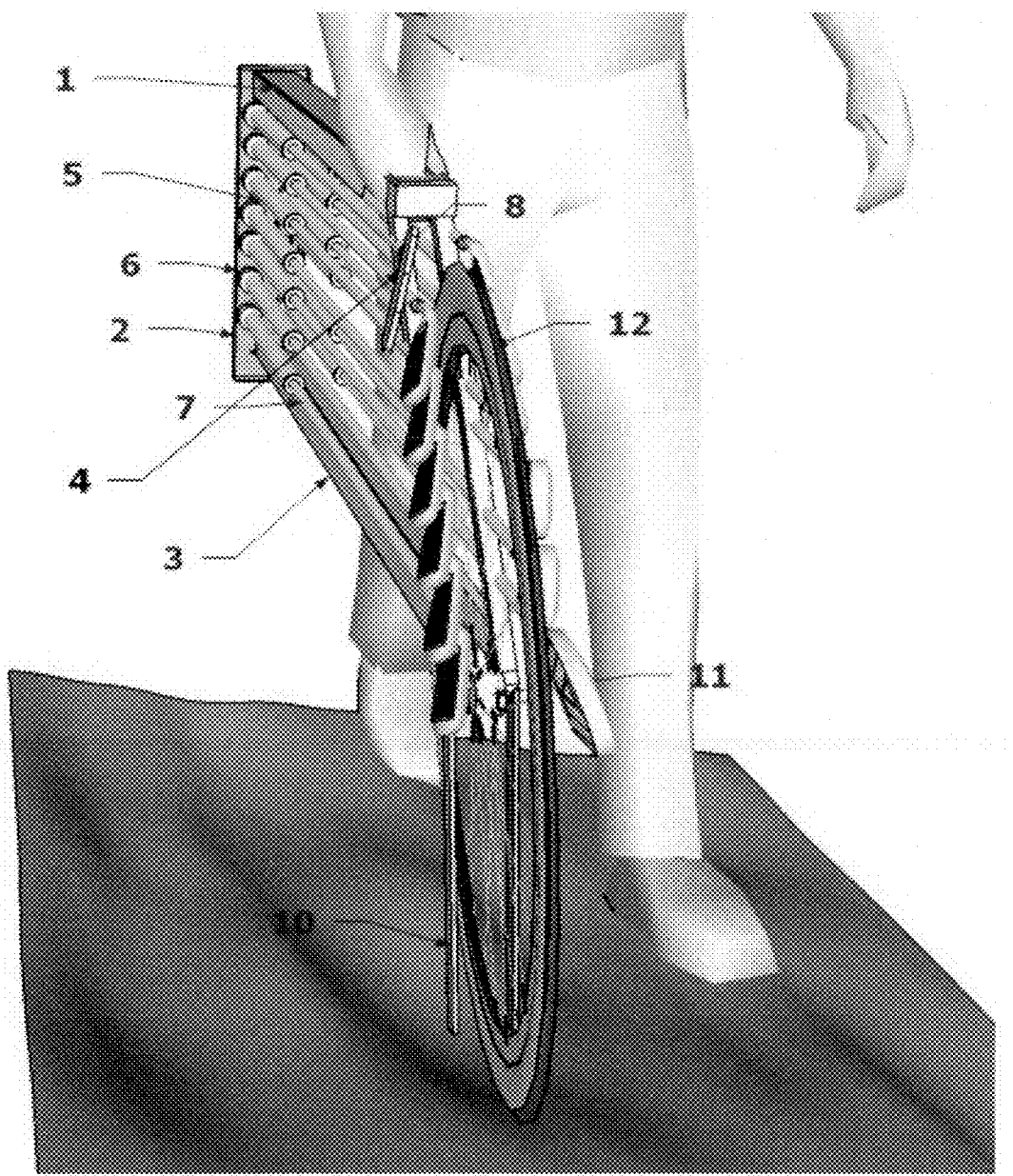
FIG. 1 is a front perspective view of the invention in walking mode.

FIG. 1 shows a spine 1 from which a backplane 2 and two legs 4 are connected. The two legs 4 are connected to the backplane 2 each with a runner 3. The bottom of each leg 4 is fixed to the wheel's 12 axle. The end of the golf club grip is inserted into a cup on the backplane 2 and the shaft of the golf club is placed in a notch on the leg 4. The golfer, using his hand holds the spine 1 positioning the center of gravity of the invention over the wheel's axel and moves the invention forward while walking.

Figure 1A:
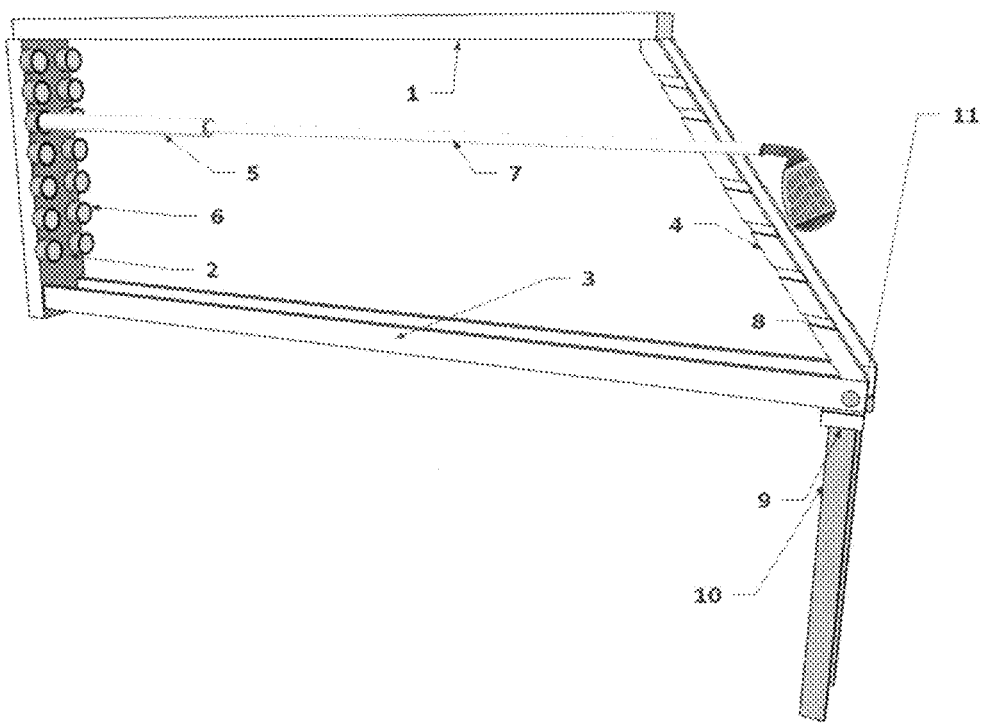
FIG. 1A is a side perspective view of the invention without the wheel.

FIG. 1A provides a side view of the invention without the wheel in order to better focus on the basic framework of the invention. The spine 1, backplane 2, two runners 3, two arms 4, and the axel 11 are connected to provide a closed solid framework to hold the weight of the golf clubs and to ensure their secure transportation. The golf club grip end 5 is placed in the cup 6 followed by the golf club's shaft 7 being placed in the parallel notch 8. The arms 4 are angled as they connect from the spine 1 to the runners 3. The resulting angle allows for the different size shafts, 5 from shorter to longer from the top to the bottom of the arm 4, to fit snugly in the notches 8. The gravity fed stands 10 are connected to the ends of the respective runners 3 using a hinge 9.

Figure 1B:
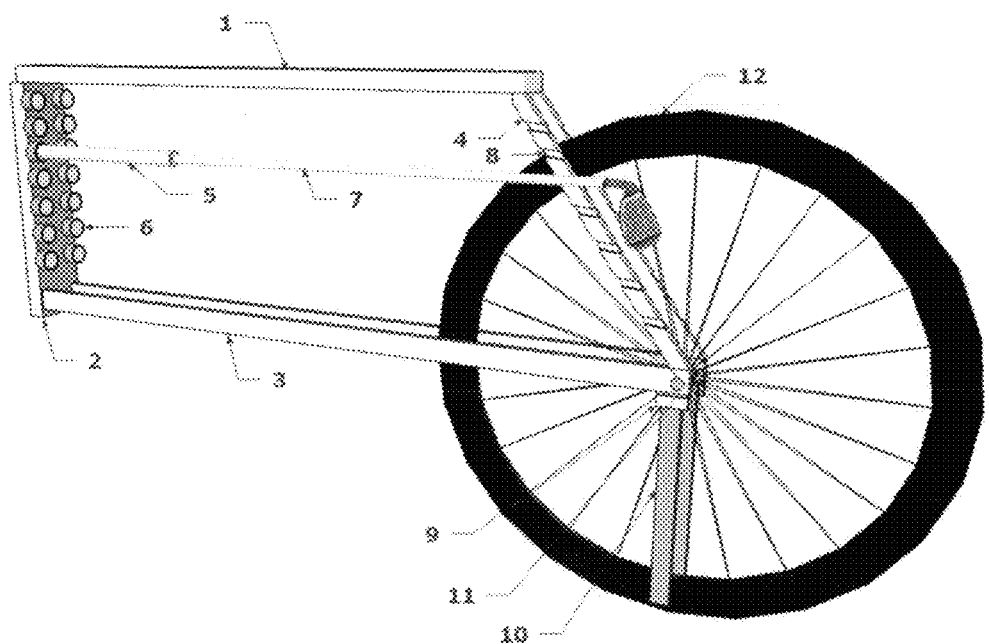
FIG. 1B is a side perspective view of the invention with the wheel.

FIG. 1B provides a side view of the invention. The view shows the relationship between the wheel 12 and the basic framework shown in FIG. 1A. The wheel 12 is on the axel 11 in a permanent manner. The placement of the wheel 12 on the axel 11 could be made removable to facilitate storage. Also, a hub driven electric motored bicycle wheel could be used in place of a regular bicycle wheel.

Figure 2:
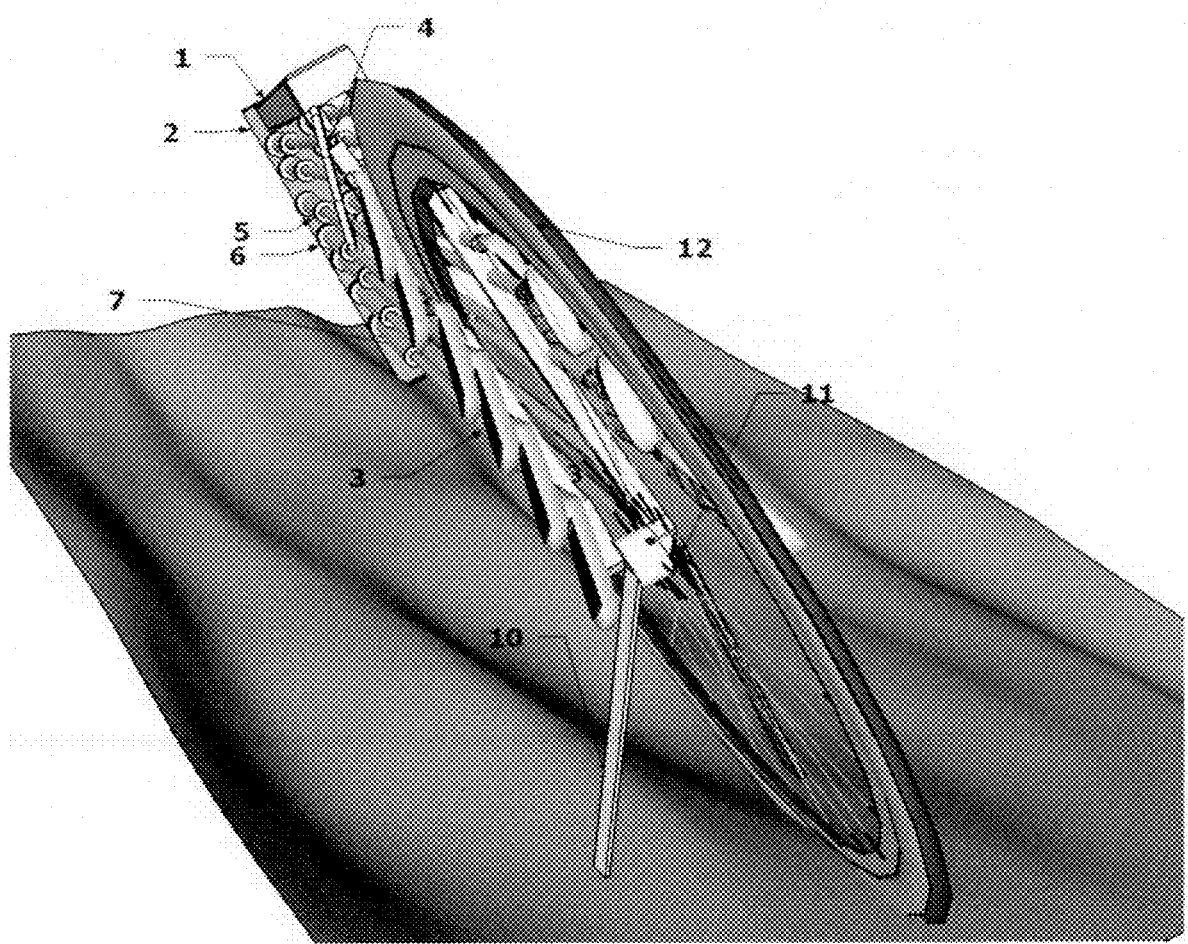
FIG. 2 is a side view of the invention in resting mode.

FIG. 2 shows the invention in the resting mode. The golfer steps back while holding the spine 1 and lowers the bottom of the backplane 2 to the ground tilting the carrier to either side in order rest the invention on the gravity fed stand 10. The invention is securely placed on the ground because the spine 1, the wheel 12, and the backplane 2 are grounded. The invention is now readily accessible for the golfer to select and replace clubs.

Figure 2A:
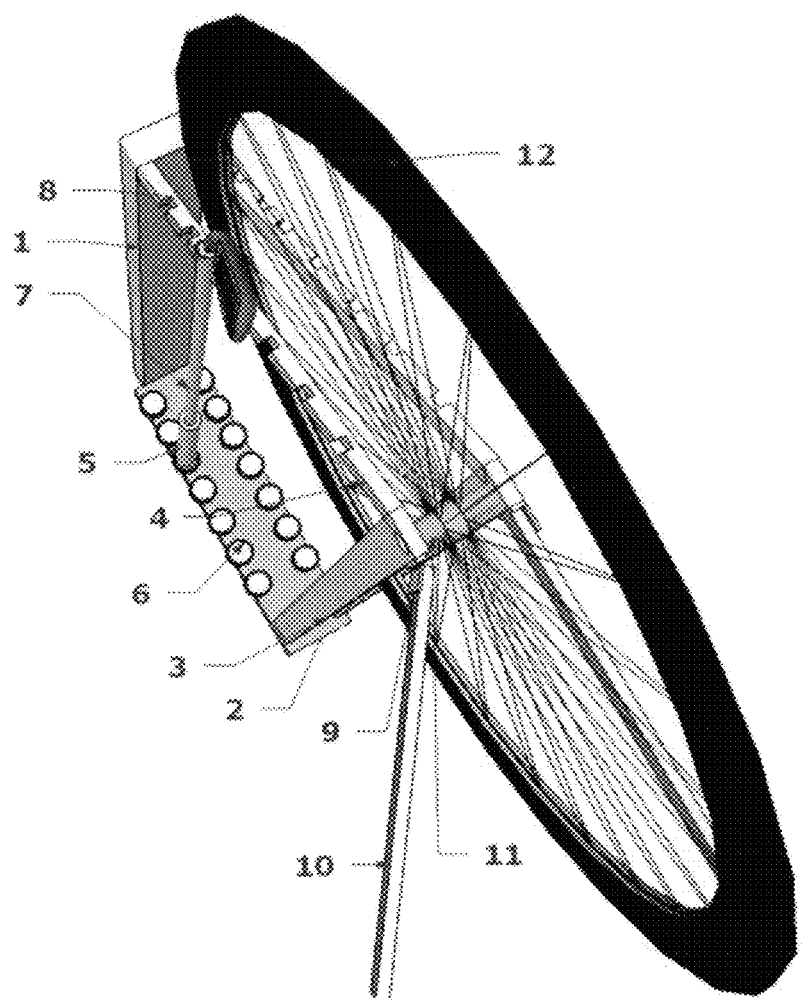
FIG. 2A is side perspective view of the invention at rest

FIG. 2A. shows a perspective view of the invention at rest. To place the invention at rest the golfer using his hand moves the spine 1 away from the wheel by walking a step backwards 12 allowing the frame 1A to rotate on the axel 11, moving the backplane 2 down to the ground, and simultaneously leaning the invention to either side dependent on which club the golfer wants.

Figure 2B:
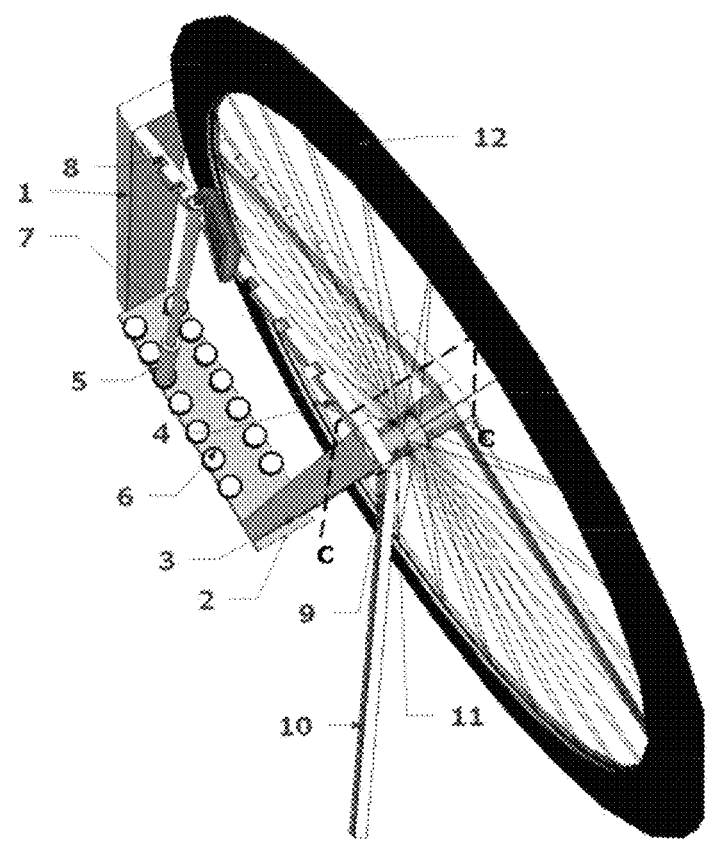
FIG. 2B is similar to 2A except it shows sectional cut indicator.

FIG. 2B. is similar to 2A except it shows sectional cut indicator C displaying the relationship between the invention and the gravity fed stand 10, the runner 3 and the axle 11.

Figure 2C:
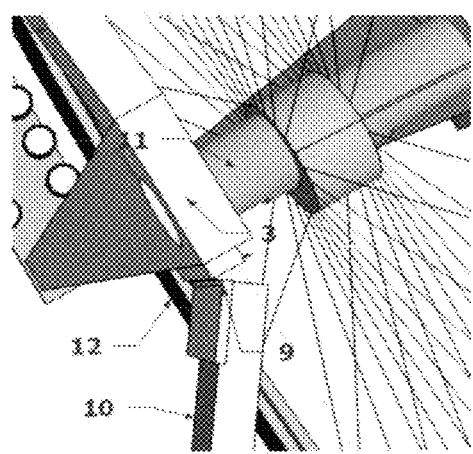
FIG. 2C is a sectional cut showing the hinge for the gravity fed stand.

FIG. 2C the sectional view shows the wheel 12 as it is attached to the axel 11 and the hinge 9 attached to the runner 3 at the bottom edge. The hinge 9 can only open away from the wheel 12 when the invention is tilted off center.

Figure 2D:
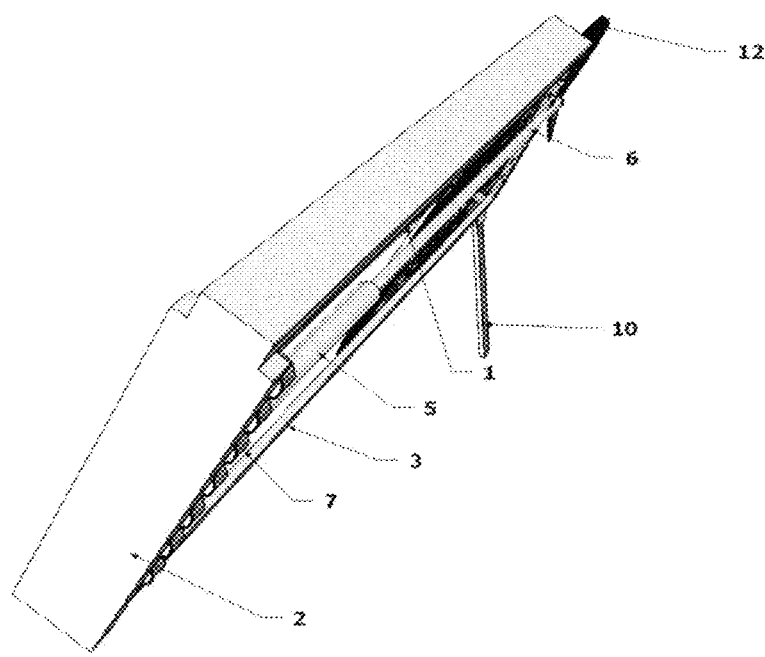
FIG. 2D is a rear view of the invention at rest

FIG. 2D shows a rear-view perspective of the invention in a resting position. It illustrates the movement of the gravity fed stand 10 away from the wheel 12 with the backplane 2 resting on its lower right corner.

Figure 2E:
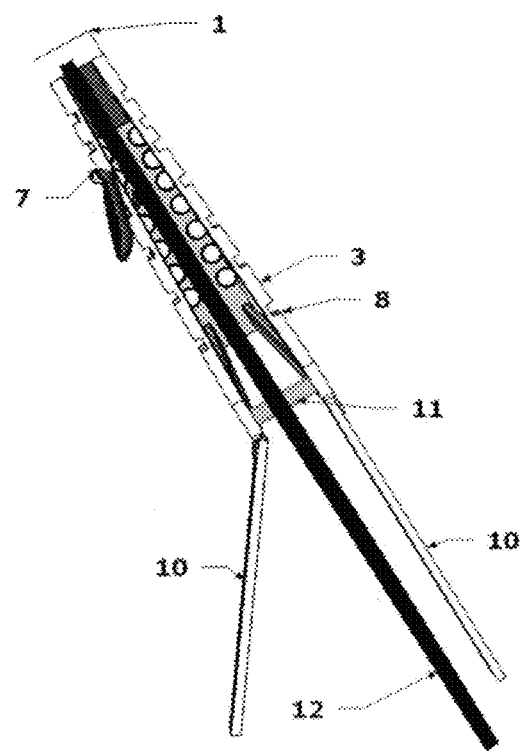
FIG. 2E is a front view of the invention at rest s

FIG. 2E shows a front view perspective of the invention in a resting position. It illustrates movement of the gravity fed stand 10 away from the wheel 12 (the stand does not move inward on the opposite side of the wheel).

What is claimed is:

1. A golf club carrier configured to carry up to 14 golf clubs, the golf club carrier comprising:
    a spine located on a top section of the carrier and positioned substantially horizontal to a ground surface upon which the carrier travels; wherein the spine has a first end portion and second end portion;
    two runners located on a bottom section of the carrier and positioned substantially parallel to the spine; wherein the runners each have a first end portion and second end portion, and wherein the length of the two runners is greater than the length of the spine of the carrier;
    a back plate perpendicularly connected to both the spine and the runners of the carrier; wherein the back plate is connected to the first end portion of both the spine and the runners; and wherein the back plate has individual cups to accommodate a grip handle of the golf club;
    two legs connected to both the spine and the runners of the carrier; wherein the two legs are each connected to the second end portion of both the spine and the runners; and wherein the legs have notches along its length to securely hold a shaft of the golf club;
    a wheel having a tire mounted thereon, and an axle; wherein the axle is connected to carrier where the runners are connected to the legs of the carrier; and
    a stand for supporting the carrier while the carrier is in a rest position; wherein the stand is connected to the carrier with a hinge that allows the stand to pivot outward from the carrier to allow the carrier to rest upon the back plate and stand on the ground surface while in the carrier is in the rest position.

2. A golf club carrier according to claim 1, wherein the tire is pneumatic.

3. A golf club carrier according to claim 1, wherein the number of individual cups can be up to 14 cups.

4. A golf club carrier according to claim 1, wherein the stand comprises two stands located on both sides of the carrier.

* * * * *